(12) United States Patent
Wellington

(10) Patent No.: US 6,775,841 B1
(45) Date of Patent: Aug. 10, 2004

(54) DUAL RATE PERIODIC RANGING SYSTEM TO REDUCE TIME TO ASCERTAIN CABLE MODEM FAILURE

(75) Inventor: Alan Miles Wellington, Needham, MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/512,390

(22) Filed: Feb. 24, 2000

(51) Int. Cl.[7] .................................................. H04N 7/64
(52) U.S. Cl. ...................... 725/111; 725/107; 348/192
(58) Field of Search ................................ 725/111, 107, 725/105, 16; 348/192; 379/1.03

(56) References Cited

U.S. PATENT DOCUMENTS

| | | | |
|---|---|---|---|
| 5,793,307 A | * | 8/1998 | Perreault et al. .......... 340/825.5 |
| 6,173,323 B1 | * | 1/2001 | Moghe ........................ 709/224 |
| 6,449,663 B1 | * | 9/2002 | Carney et al. ................ 710/15 |
| 6,453,472 B1 | * | 9/2002 | Leano et al. ................ 725/111 |
| 6,469,986 B1 | * | 10/2002 | Lecheler et al. ............ 370/252 |

* cited by examiner

Primary Examiner—John Miller
Assistant Examiner—Nathan Sloan
(74) Attorney, Agent, or Firm—Caroline Cokee; Karin L. Williams

(57) ABSTRACT

In a cable modem system, a method and apparatus is provided to reduce the time to ascertain modem failure by sensing ranging nonresponses and increasing the frequency of the ranging invitations upon detection of a predetermined number of nonresponses. The increased frequency of ranging invitations decreases the time required to ascertain modem failure, modem failure being defined to be a predetermined number of nonresponses, for instance 16. In so doing, a system is provided which minimizes the bandwidth necessary for rapid modem failure detection.

13 Claims, 2 Drawing Sheets

DUAL RATE PERIODIC RANGING SYSTEM TO REDUCE TIME TO ASCERTAIN CABLE MODEM FAILURE

FIELD OF INVENTION

This invention relates to telecommunications systems and more specifically in a cable modem system to a method and apparatus for reducing the time it takes to ascertain that a modem has failed.

BACKGROUND OF THE INVENTION

Modem cable television systems are widely used not only for the transmission of television signals to subscriber homes, but also for the two-way transmission of data to and from subscriber homes. A cable modem network consists of a number of cable modems in subscriber homes, a cable modem headend system, and a coaxial or hybrid-fiber/coax communication link between the headend and the subscriber modems. Unlike traditional dial modems, cable modems transmit and receive digital signals at radio frequencies.

Prior to the present Data Over Cable Service Interface Specification, or DOCSIS, a number of cable modem and headend system vendors developed a wide range of systems which worked differently, with each having their own unique proprietary protocol for transmission of data over the communications link. As a result of this ad hoc approach, standardization was deemed necessary and appeared to be required so that cable company operators could obtain competitive pricing. The benefit was to be able buy to a modem from any vendor and make sure that it would work with any headend system. A standard protocol was subsequently issued by the DOCSIS standards group, which developed the standard now known as the DOCSIS RF interface specification.

As part of the DOCSIS specification, there is a protocol relating to ranging. Ranging refers to the ability of a headend system to measure power level, frequency and timing of signals generated by a subscriber modem and transmitted over a communication link; and to send error or correction signals back to the subscriber modem so as to optimize the subscriber modem for robust data transmission. These error signals are then used by the subscriber modem to adjust the power level, to modify the frequency, and to transmit data with adjusted timing.

According to the DOCSIS protocol, an invitation to range is sent to each of the subscriber modems. The subscriber modems then send a ranging request to the headend system. The headend system then sends a map message to the subscriber modems. Ordinarily the map message includes information regarding the upstream bandwidth allocation and which modem can transmit, and when. The typical items that might be included in the map message are opportunities for modems to ask for bandwidth, opportunities for modems to transmit data, opportunities for modems to join the network, and invitations to send ranging requests.

In terms of the DOCSIS standard, it is required that the headend system provide one invitation for each modem to range no less than once every thirty seconds. If thirty seconds elapse during which time the modem fails to receive a ranging invitation the modem is required to reset. Because of the potential for losses on the downstream communications link, it is important to provide more than one invitation every thirty seconds. Moreover, it will be appreciated that this requirement to transmit a ranging request at least every thirty seconds in some instances is too infrequent for the receiver to reliably receive the invitation. This is because of losses along the communication link. It is therefore important to have ranging invitations transmitted more frequently, such as every ten seconds.

Thus, because of the possibility of lost messages, it is oftentimes required that the subscriber modem range for instance every ten seconds as opposed to every thirty seconds. This utilizes not insignificant resources, both at the subscriber modem and at the headend system. Note, the amount of signaling between the subscriber modem and the headend system increases as ranging invitations increase in rate.

Assuming that the subscriber modem is sent a ranging invitation every ten seconds, and further assuming from the DOCSIS specification that a modem is ascertained as having failed if to there is no response from the modem after sixteen tries, then it will be appreciated that it may take one hundred and fifty seconds to ascertain that the modem has failed, ie. two and a half minutes.

From an operational point of view, this is an exceedingly long period of time to ascertain that the modem is not responding.

The alternative to improving this scenario is to poll the modems somewhat more frequently. However, if for instance the modems are polled once a second, the overhead necessary to support such a polling function of for instance 1500 modems is excessive. Were this the case, bandwidth limitations would restrict the amount of data transmittable by the modem to the headend system and vice versa due to the high overhead involved. For instance, assuming 1500 modems are linked to a particular headend system, and further assuming that each of the modems is being invited to range once a second, up to 100 percent of the bandwidth is used in the process which either eliminates data transmission altogether or significantly reduces the amount of the data through-put and slows down communications.

There is therefore a need to be able to ascertain in the quickest possible time that a modem has failed, while not significantly using up the resources of the system.

SUMMARY OF THE INVENTION

In order to reduce the time that it takes to ascertain that a modem has failed, in the subject invention the frequency at which periodic invitations are transmitted to the subscriber modem is switched from a low frequency to a higher frequency upon the detection of a predetermined number of ranging nonresponses. In one embodiment, ranging invitations are sent out at a low rate or frequency, for instance every ten seconds. If the subscriber modem does not respond after three invitations, the periodic invitations are sent out a higher rate or frequency, in one embodiment once every five seconds.

The result is that the time it takes to ascertain that a modem has failed is decreased based upon a previous, albeit short history of failures. Thus for instance the sixteen failed attempts specified by the DOCSIS protocol can be ascertained within 1½ minutes, instead of within 2½ minutes. The time for ascertaining modem failure of course depends upon the number of ranging nonresponses which constitute the trigger point and the increased rate or frequency at which ranging invitations are transmitted.

It will be appreciated that in the illustrative example, while the higher frequency is set to be twice that of the low frequency, it is possible to configure the system to even further reduce the time necessary to ascertain modem failure by either increasing the higher frequency or decreasing the number of initially failed responses which result in switching to the higher frequency. Thus, the time to ascertain modem failure can be reduced even further.

From the headend system administrator's point of view, the subject system permits an increase in upstream bandwidth to the extent that overhead and resources are not over-utilized by the ranging process. By upstream is meant the direction that data is sent from the subscriber modem to the headend system. Thus, in the subject system the headend system is spending less time performing the ranging task, thereby freeing up resources at the headend to permit the forwarding of data or packets.

In summary, in a cable modem system a method and apparatus is provided to reduce the time to ascertain modem failure by sensing ranging nonresponses resulting from periodic ranging invitations and increasing the frequency of the ranging invitations upon a predetermined number of nonresponses. The increased frequency of ranging invitations decreases the time required to ascertain modem failure. Modem failure is defined to be a predetermined number of nonresponses, for instance 16 nonresponses. In so doing, a system is provided which minimizes the bandwidth necessary for rapid modem failure detection. This is accomplished by increasing the frequency of invitations when a predetermined number of failures are detected, thus minimizing the number of resources necessary for modem failure detection as well as reducing bandwidth requirements.

BRIEF DESCRIPTION OF THE DRAWINGS

These and other features of the subject invention will be understood better in connection with the Detailed Description in conjunction with the Drawings, of which.

DETAILED DESCRIPTION

Figure 1:
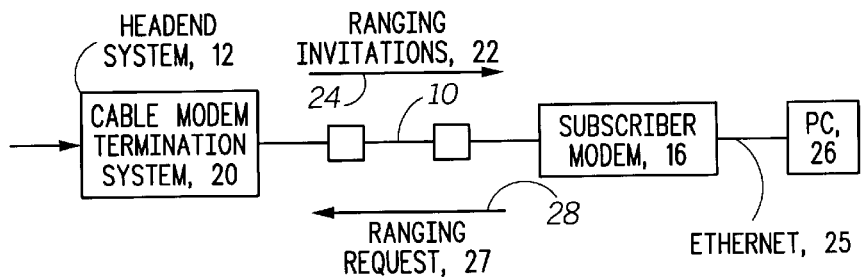
FIG. 1 is a block diagram of a data transmission system illustrating a subscriber modem coupled to a headend system which includes a cable modem termination system in which, after a ranging invitation, ranging requests are sent from the subscriber modem to the cable modem termination system.

Referring now to FIG. 1, a typical hybrid fiber/coax communication link 10 is provided between a headend system 12 and a subscriber modem 16. Typically, the headend system includes a cable modem termination system 20, which transmits ranging invitations 22 in a downstream direction illustrated by arrow 24 to modem 16. Typically, modem 16 is coupled to either a local area network such as ethernet 25 or directly to a PC 26, with as many as 1500 or more modems being connected via communications link 10 to a single interface card in the cable modem termination system 20. Typically, upon receipt of an invitation, a ranging request 27 is transmitted to the headend system in the upstream direction 28.

In order for the headend system to ascertain that a given modem is connected and is working, the headend system must first detect a ranging request from the modem. This ranging request will be made in response to a ranging invitation detected at the subscriber modem.

After detection of the existence of a ranging request, the headend system measures power level, frequency and timing of signals from the subscriber modem. Based on these measurements, the modem is instructed to adjust the power, frequency and the timing of the signals sent from the modem to the cable modem termination system. Timing adjustments can be made such that particular packets or data are sent out either a certain number of microseconds sooner or later to accommodate upstream propagation delays.

In order for the headend system to be able to ascertain how to adjust power, frequency and timing, headend system 12 periodically transmits ranging invitations to all of the subscriber modems connected thereto. Not only is information transmitted back in the upstream direction from the modems, it is possible to ascertain from the ranging request whether or not a particular modem is in fact operational and or connected to the headend system.

In order to establish robust communication, according to the DOCSIS protocol, the headend system is required to transmit ranging invitations at least every 30 seconds. A modem failure is defined by the DOCSIS protocol when invitations to range are transmitted 16 times in a row with there being no response from the particular modem. After 16 nonresponses the modem is deregistered.

As mentioned hereinbefore, headend systems may transmit ranging invitations more frequently than once every 30 seconds. The purpose is to be able to ascertain modem health when the communications channel is intermittently impaired resulting in lost messages. If the headend system transmits a ranging invitation only once every 30 seconds, then it is possible that the modem will be needlessly reset since it will not receive the lost invitation. As described above, it would theoretically be possible to transmit ranging invitations once per second. However, receiving ranging requests once per second from all 1500 modems could occupy close to 100 percent of the bandwidth of the system, making such a scenario ill advised.

In practice, optimization dictates a scenario in which ranging invitations are sent out once every 10 seconds. As mentioned above, in this scenario it will take two and one half minutes to ascertain a modem failure, a relatively long period to know that communication between the headend system and a particular modem has ceased.

Figure 2:
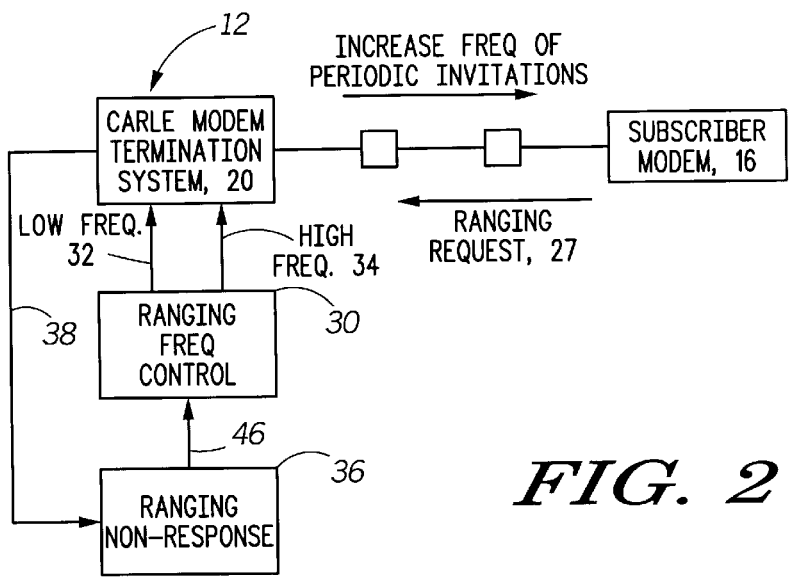
FIG. 2 is a block diagram illustrating that the headend system increases the frequency of periodic ranging invitations to the subscriber modems in response to a predetermined number of detected nonresponses.

Referring now to FIG. 2, headend system 12 provides an increased frequency of periodic invitations to subscriber modem 16 upon detection of a predetermined number of nonresponses. Here, a ranging frequency control unit 30 coupled to cable modem termination system 20 is used to switch from a lower frequency 32 to a higher frequency 34 upon detection of a predetermined number of ranging nonresponses as illustrated at 36. To accomplish this, upstream ranging requests from the subscriber modem are routed to ranging nonresponse unit 36 over line 38 from cable modem termination system 20.

Upon the detection of a predetermined number of nonresponses, such as three, the headend system increases the frequency of its periodic invitations, in one embodiment by doubling the frequency or rate. This in turn significantly reduces the time to be able to ascertain that 16 nonresponses have occurred.

Figure 3:
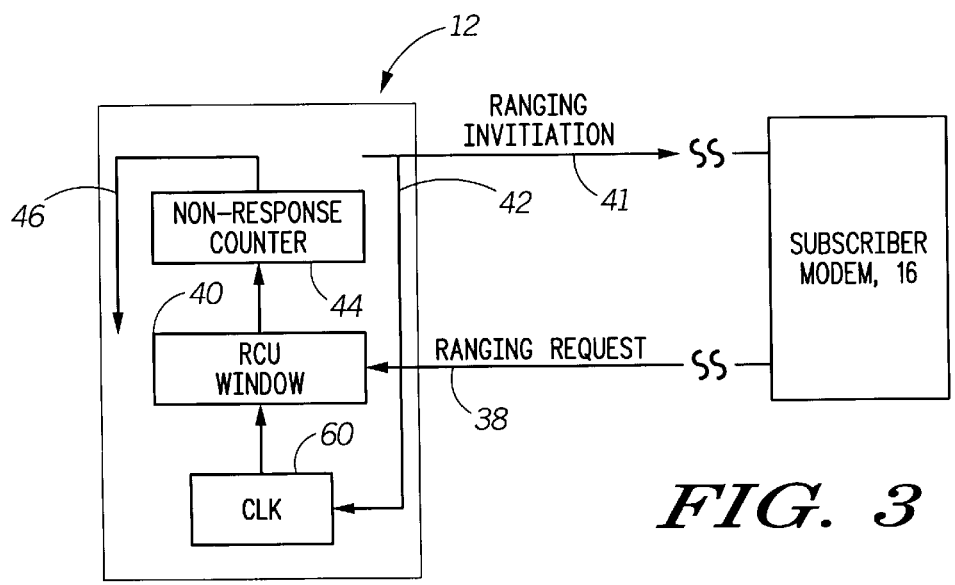
FIG. 3 is a block diagram illustrating that a receive window is opened at the headend system which extends a predetermined time after the transmitted ranging invitation, with the non-existence of a ranging request within the window indicating a failed attempt to communicate; and, FIG. 4 is a flow chart indicating one algorithm specifying a method for speeding up detection of a failed modem.

Referring now to FIG. 3, a window 40, responsive to clock ("CLK") 60, is set at the cable modem termination system which starts when a predetermined ranging invitation 41 has been sent to a particular subscriber modem. This is indicated by a signal over line 42. If a ranging response is not received within this window, then a nonresponse is indicated by counter 44. Counter 44 counts the number of nonresponses, and upon the nonresponses exceeding a predetermined limit transmits a signal over line 46 to the ranging frequency control unit 30 to increase the frequency at which invitations are sent.

Figure 4:
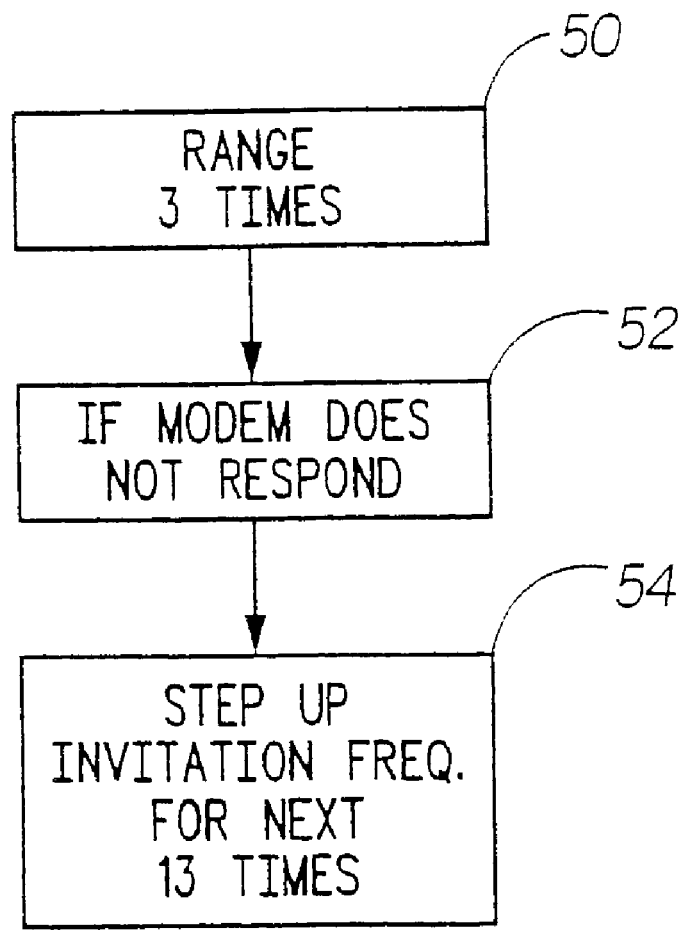

Referring now to FIG. 4, in one embodiment as illustrated at 50 three ranging invitations are sent to a particular modem. If, as illustrated at 52, the modem in question does not respond to any of the three invitations, then as illustrated at 54 the invitation frequency or rate is increased for the next 13 times.

It will be appreciated that the time to ascertain modem failure is reduced by the higher frequency set at 54, such that if the modem has in fact failed for the subsequent 13 attempts, then the time to ascertain the subsequent 13 failures is reduced due to the higher frequency at which ranging invitations are sent out.

In one embodiment, the initial frequency or rate at which ranging invitations are sent out is once every 10 seconds, whereas the higher frequency at which invitations are sent out having detected a predetermined number of failures is once every 5 seconds. It will be appreciated that the number of nonresponses is settable, such that instead of 3 nonresponses, the number of nonresponses responsible for tripping the higher rate can be set to 2 or 4. Setting the limit for nonresponses to 2 before going to the higher invitation frequency gives a somewhat earlier warning that a modem is not online. However, the disadvantage of this scenario is that higher frequency ranging uses up bandwidth.

Likewise, the higher frequency can be set to once every 3 seconds instead of once every 5 seconds. Again, the considerations involved are centered around the bandwidth necessary to poll some 1500 modems, with the embodied settings being 3 nonresponses and the higher frequency set at a 5 second interval between ranging invitations.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In a cable modem system, a method for reducing the time for a headend system to ascertain subscriber modem failure, comprising the steps of:
   providing a sequence of ranging invitations transmitted from the headend system over a network to a subscriber modem at one rate;
   detecting a number of nonresponses at the headend system after initiation of the ranging invitation sequence;
   responsive to a predetermined number of nonresponses detected at the headend system, increasing the rate at which the ranging invitations are transmitted; and,
   ascertaining when after initiation of the ranging invitation sequence a predetermined number of nonresponses has been detected at the headend system, thus to indicate subscriber modem failure in a time foreshortened by the increased rate at which the ranging signals are transmitted.

2. The method of claim 1, wherein the rate at which ranging invitations are transmitted is one every ten seconds.

3. The method of claim 2, wherein the predetermined number of nonresponses resulting in increasing the rate at which ranging invitations are sent is three.

4. The method of claim 1, wherein the detecting step includes the steps of establishing a time window starting with the initiation of the sequence of ranging invitations, with the length of the window corresponding to the time that the predetermined number of nonresponses is expected to exist at the headend system and ascertaining if there are the predetermined number of nonresponses in the time window.

5. The method of claim 4, wherein the step of ascertaining if there are the predetermined number of nonresponses includes counting the number of nonresponses in the time window.

6. In a cable modem system a method of reducing the time it takes for a headend system to ascertain subscriber modem failure, comprising the steps of:
   detecting where a predetermined number of nonresponses have occurred after transmission of a ranging invitation sequence; and
   increasing the rate at which ranging invitations are sent responsive to the predetermined number of nonresponses having occurred.

7. Apparatus for reducing the time it takes for a headend system to ascertain subscriber modem failure comprising:
   a ranging invitation control unit for switching the rate that ranging invitations are transmitted to the subscriber modem from a low rate to a higher rate;
   a ranging nonresponse detector for detecting when after initiation of a ranging sequence a predetermined number of nonresponses from said subscriber modem has occurred and for generating a ranging nonresponse signal; and,
   means for coupling said ranging nonresponse signal to said ranging nonresponse detector, whereby this increased rate at which said ranging invitations are sent decreases the time necessary to ascertain modem failure.

8. The apparatus of claim 7, and further including a modem failure detector coupled to said ranging nonresponse detector for ascertaining when a predetermined number of nonresponses have occurred, thus to indicate modem failure.

9. The apparatus of claim 8, wherein the number of ranging nonresponses indicative of modem failure is 16.

10. The apparatus of claim 9, wherein the higher rate is double the lower rate.

11. The apparatus of claim 9, wherein the number of nonresponses resulting in switching from a low rate to a higher rate is three.

12. The apparatus of claim 7, wherein the speed at which modem failure is ascertained is dependent upon the ratio of the higher rate to the lower rate.

13. The apparatus of claim 12, wherein the higher rate in combination with the number of nonresponses resulting in said switching is such as to limit the overhead utilized in performing ascertaining modem failure.

* * * * *